(12) United States Patent
Tylik et al.

(10) Patent No.: US 10,891,060 B2
(45) Date of Patent: Jan. 12, 2021

(54) DATA STORAGE SYSTEM BINDING VIRTUAL VOLUMES TO HOST-SPECIFIC PROTOCOL ENDPOINTS

(71) Applicant: EMC IP Holding Company LLC, Hopkinton, MA (US)

(72) Inventors: Dmitry Tylik, Westborough, MA (US); Anil Kumar Koluguri, Raleigh, NC (US); Matthew H. Long, Uxbridge, MA (US); Yuri A. Stotski, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 16/176,244

(22) Filed: Oct. 31, 2018

(65) Prior Publication Data

US 2020/0133521 A1   Apr. 30, 2020

(51) Int. Cl.
*G06F 3/06* (2006.01)
*G06F 9/455* (2018.01)

(52) U.S. Cl.
CPC .......... *G06F 3/0622* (2013.01); *G06F 3/0662* (2013.01); *G06F 3/0673* (2013.01); *G06F 9/45558* (2013.01); *G06F 2009/45583* (2013.01)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,613,082 A * | 3/1997 | Brewer | ................. | G06F 3/0601 360/134 |
| 5,987,621 A * | 11/1999 | Duso | ................... | G06F 11/2023 348/E5.008 |
| 6,487,474 B1 * | 11/2002 | Goodman | ............. | G06F 3/0622 369/30.31 |

(Continued)

OTHER PUBLICATIONS

A. Suyyagh and Z. Zilic, "Energy and Task-Aware Partitioning on Single-ISA Clustered Heterogeneous Processors," in IEEE Transactions on Parallel and Distributed Systems, vol. 31, No. 2, pp. 306-317, Feb. 1, 2020 (Year: 2020).*

*Primary Examiner* — Daniel C. Chappell
(74) *Attorney, Agent, or Firm* — BainwoodHuang (57) ABSTRACT

Data storage systems of a cluster associate virtual volumes (VVols) with protocol endpoints (PEs) organized into host-specific initiator groups. From the perspective of the hosts, the PEs are specialized SCSI LUNs that aggregate the VVols bound thereto. In operation, a host directs VVol access requests to the host-specific PEs, and a data storage system processes the VVol requests as received via the corresponding PEs.

21 Claims, 4 Drawing Sheets

(56) References Cited

U.S. PATENT DOCUMENTS

| | | | |
|---|---|---|---|
| 6,684,209 B1* | 1/2004 | Ito | G06F 3/0622 |
| | | | 707/783 |
| 7,234,075 B2* | 6/2007 | Sankaran | G06F 11/1458 |
| | | | 714/13 |
| 7,702,879 B2* | 4/2010 | Yudenfriend | G06F 3/0683 |
| | | | 711/201 |
| 8,055,734 B2* | 11/2011 | Helman | H04L 67/1097 |
| | | | 709/220 |
| 8,498,967 B1* | 7/2013 | Chatterjee | G06F 16/27 |
| | | | 707/674 |
| 8,825,851 B2* | 9/2014 | Nayak | H04L 67/1097 |
| | | | 709/224 |
| 8,875,134 B1* | 10/2014 | van der Goot | G06F 9/45558 |
| | | | 711/162 |
| 9,210,100 B2* | 12/2015 | Van Der Linden | G06F 9/5077 |
| 9,223,659 B1 | 12/2015 | Natanzon et al. | |
| 9,552,217 B2* | 1/2017 | Tarasuk-Levin | G06F 16/273 |
| 9,575,857 B1* | 2/2017 | Natanzon | G06F 11/2071 |
| 9,659,075 B2* | 5/2017 | Alewine | G06F 11/1662 |
| 9,864,539 B1* | 1/2018 | Tylik | G06F 3/0631 |
| 9,928,120 B1* | 3/2018 | Chinnam | G06F 9/526 |
| 9,986,023 B1* | 5/2018 | Lyon | H04L 47/78 |
| 10,037,427 B1* | 7/2018 | Krivenok | G06F 21/575 |
| 10,146,574 B1* | 12/2018 | Krivenok | G06F 3/061 |
| 2002/0120763 A1* | 8/2002 | Miloushev | G06F 16/1824 |
| | | | 709/230 |
| 2003/0149695 A1* | 8/2003 | Delaire | G06F 16/1824 |
| 2005/0228835 A1 | 10/2005 | Roa | |
| 2010/0241711 A1* | 9/2010 | Ansari | H04L 12/66 |
| | | | 709/205 |
| 2013/0055248 A1* | 2/2013 | Sokolinski | H04L 67/1097 |
| | | | 718/1 |
| 2013/0080559 A1* | 3/2013 | Rao | H04L 43/10 |
| | | | 709/208 |
| 2014/0006731 A1 | 1/2014 | Uluski et al. | |
| 2018/0341472 A1* | 11/2018 | Simharajan | G06F 9/5061 |
| 2018/0341569 A1* | 11/2018 | Rao | G06F 16/22 |

* cited by examiner

DATA STORAGE SYSTEM BINDING VIRTUAL VOLUMES TO HOST-SPECIFIC PROTOCOL ENDPOINTS

BACKGROUND

The present invention relates to the field of data storage systems, including data storage subsystems of so-called converged systems having tightly integrated storage, network and compute subsystems. More particularly, the present invention relates to data storage systems providing support for virtualized storage resources, such as virtual volumes, in a virtual-computing environment.

SUMMARY

The present invention is motivated in part by a technology trend in which data storage systems have tighter functional integration with hypervisors/virtualization environments such as vSphere® from VMware® and Hyper-V® from Microsoft®. To facilitate such integration, specialized virtual-computing application programming interfaces (APIs) are used, such as vSphere API for Storage Awareness (VASA) 2.0 from VMware. This API is based on the notion of virtual volumes (VVols), which represent individual virtual disks of virtual machines, and protocol endpoints (PEs) which serve as access points for multiple VVols to virtual-computing hosts (e.g., ESXi hosts). SCSI specifications use the term "conglomerate LUN" for PEs and "subordinate LUN" for virtual volumes.

The following are factors preferably taken into account in implementing protocol endpoints (PEs) in a clustered data storage system:

1. Minimize latency for IO transactions to VVols bound to PEs. In one approach, it is preferred that are local to two-node storage appliances of a cluster.

2. Balance IO load across storage appliances and processing nodes. Each appliance may include two nodes servicing IO, the nodes being implemented in the form of control virtual machines or docker containers deployments of the same software.

3. Scale SCSI command handling. For example, the VASA protocol requires that data state related Unit Attentions be raised on a per VVol basis, and path state related Unit Attentions be raised on a per PE basis. In environments with many ESXi hosts accessing the same set of PEs, this could result in hosts reacting to Unit Attentions that are not relevant, unless there is some mechanism for more targeted sending of Unit Attentions to the hosts.

4. Scale out of band management (e.g., VASA API). This can be accomplished by a mechanism for only reporting relevant PEs to ESXi hosts.

Disclosed is a method of operating a data storage system in a cluster of storage systems to provide virtual-volume data storage to a plurality of virtual-computing (VC) hosts. Each data storage system of the cluster includes first and second processing nodes paired in an active-active manner to provide for (a) shared processing of a workload in a non-failure operating condition, and (b) single-node processing of the workload in a failover operating condition.

The disclosed method includes organizing physical storage as a plurality of virtual volumes (VVols) each being a virtualized unit of storage for a corresponding virtual machine hosted by a respective VC host. It further includes creating protocol endpoints (PEs) and organizing the PEs into host-specific initiator groups (IGs). Each PE is a conglomerate storage device to which a respective set of the VVols are to be bound for access by a respective VC host. Each IG contains a pair of the PEs for a corresponding VC host, one PE of the pair being advertised to the VC host as optimized on the first processing node and being advertised to the VC host as non-optimized on the second processing node, the other PE of the pair being advertised to the VC host as optimized on the second processing node and being advertised to the VC host as non-optimized on the first processing node. The VVols are then bound to the PEs, each VVol of a given VC host being bound to one of the pair of PEs of the corresponding host-specific IG. Subsequently, the data storage system provides providing data access to the VVols from the VC hosts via the PEs.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
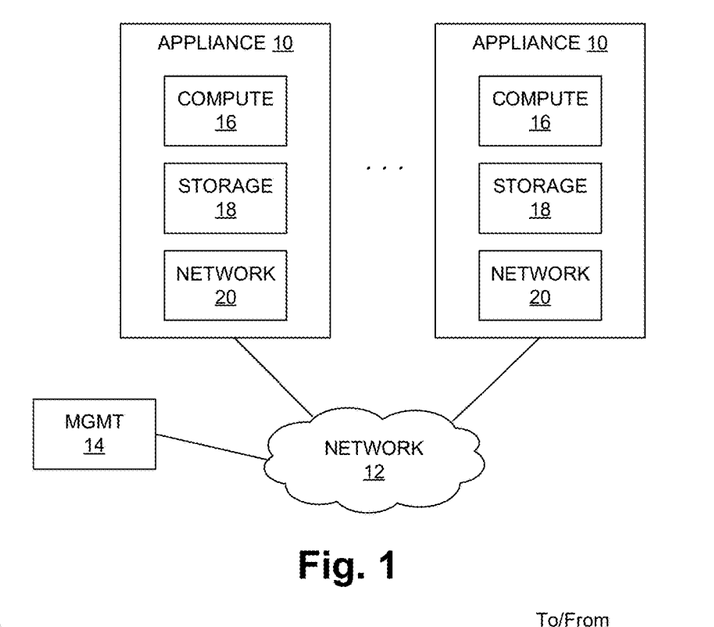
FIG. 1 is a block diagram of a data processing system employing converged infrastructure with appliances having co-located compute, storage and network subsystems.

FIG. 1 shows a data processing system having a plurality of compute appliances 10 functionally coupled by a data communications network 12. The system also includes a management station 14 as shown. In this example of so-called "converged" infrastructure, each appliance 10 includes a compute subsystem 16, storage subsystem 18 and network subsystem 20. As generally known in the art, each subsystem 16, 18 and 20 includes corresponding hardware and software resources specially tailored for the corresponding functionality. The compute subsystem 16 includes processors, memory and interface logic enabling it to execute system-level software such as operating systems, hypervisors, etc. along with user-level applications such as database applications, transaction applications, other server applications, etc. The network subsystem 20 includes specialized interface circuitry, processing circuitry and software/firmware enabling it to provide data communications services including local-area networking, clustering, wide-area networking, etc. The data storage subsystem 18, which may also be referred to as a data storage system 18 herein, includes specialized interface circuitry, processing circuitry, and physical storage devices (such as disks, Flash memory modules, etc.) enabling it to provide a variety of secondary storage related services. More details regarding the data storage subsystems 18 in particular are provided below.

Although FIG. 1 suggests a separate physical housing for the management station 14, it may alternatively be realized as a management station application executed by one of the appliances 10.

Figure 2:
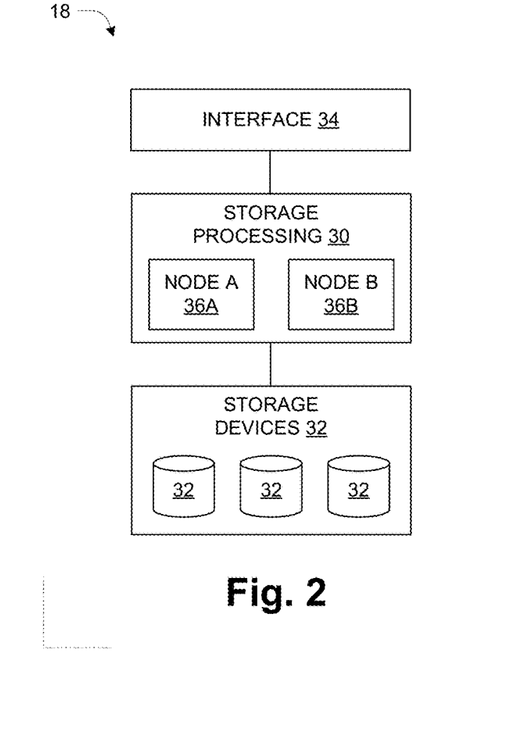
FIG. 2 is a block diagram of a storage subsystem.

FIG. 2 is a block diagram of the data storage system 18. It includes storage processing circuitry 30, a set of physical storage devices 32, and interface circuitry 34 for interfacing to the compute and network subsystems 16, 20 (FIG. 1). The storage processing circuitry 30 has two separate processing nodes, shown as an A node 36A and a B node 36B. Each of these is a complete storage processor with software providing all storage-related functionality, for example the handling of incoming storage read and write requests, configuration and maintenance operations, and in particular data and management operations related to virtual volumes (VVols), as briefly mentioned above and described more fully below. In this respect the operating software interacts with corresponding virtual-computing functionality of the compute subsystem 16 and the management station 14, as well as with peer storage systems 18 of other appliances 10.

Although the above description suggests that the storage subsystem 18 includes dedicated hardware resources including processor resources, which is indeed one type of implementation, it may also be realized as a special virtual machine (VM) executing on a virtual-computing server. In one embodiment a storage subsystem 18 can be realized as a control VM in such a VC server.

In one embodiment a collection of storage systems 18 is organized as a cluster to provide increased performance and resiliency, as generally known in the art. Cluster functionality is also implemented in the operating software executed by the nodes 36A, 36B. Additionally, within a given storage subsystem 18 the two nodes 36A, 36B have additional interrelated functionality, for example providing "active-active" redundancy in which (1) in the absence of failures, each node 36 processes a corresponding portion of an overall workload, so there is workload sharing between the two nodes 36A, 36B, and (2) upon failure of one node 36, its workload is automatically transferred to the other node 36, providing for ongoing operation albeit at reduced performance until the failure is corrected or other corrective action is taken.

The description below is directed to operation at a logical layer generally above the physical layer at which data is transferred to and from the physical storage devices 32. As generally known in the art, data storage systems typically create logical abstractions of underlying storage and present these to operating software (e.g., applications, operating systems, hypervisors) to provide certain overall system benefits. For example, the specialized chores of managing the physical storage devices 32 can be contained in the specialized data storage system 18, freeing the compute subsystem 16 and its various operating software (especially applications) from any need to address such details. Block-structured abstractions such as logical units (LUNs) and volumes are generally known. A file system and its collection of user-visible files and directories is also such an abstraction. Such higher-level logical operations are provided by the storage processing 30. The present description is directed to certain specific types of higher-level logical operations, related to virtual volumes (VVols) and protocol endpoints (PEs), as described more below.

Figure 3:
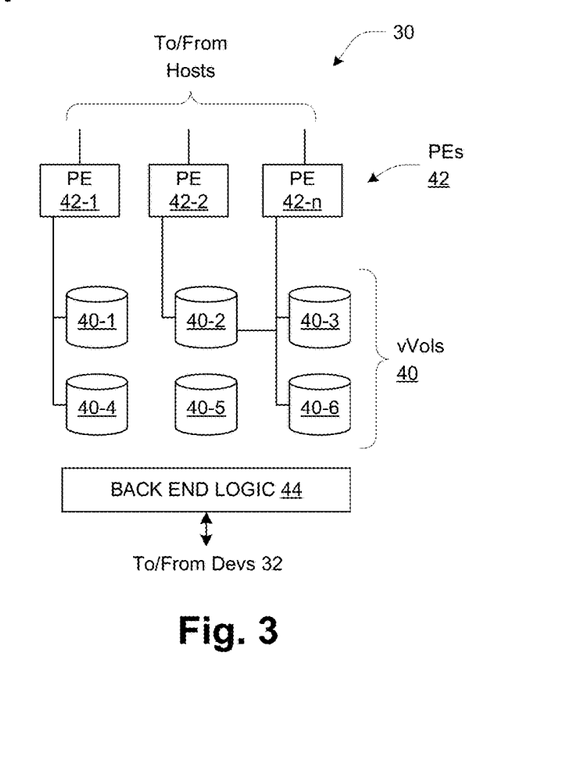
FIG. 3 is a block diagram of a storage processing section of a storage subsystem, specifically an organization of virtual volumes (VVols) assigned to corresponding protocol endpoints (PEs)

FIG. 3 illustrates pertinent logical-layer organization of the storage processing 30. It includes virtual volumes or VVols 40, protocol endpoints or PEs 42, and back end logic 44. The PEs 42 are targets of data storage requests from external requestors indicated as "hosts" in FIG. 3, and the back end logic 44 provides a translation between operations on the VVols 40 and the underlying physical storage devices 32. Although the operations involved in this translation are generally very involved and complex, they are generally known in the art and not elaborated further herein. In one example the hosts are hypervisors executing on compute subsystems 16.

A major function of the PEs 42 is to serve as aggregations or conglomerations of VVols 42. This is indicated in FIG. 3 by specific interconnections, e.g., the connection between PE 42-1 and VVols 40-1 and 40-4 for example. This means that PE 42-1 is the access point (for external requestors) for these two VVols. As explained more below, the PEs 42 are host-specific and thus each aggregates those VVols 40 that are accessed by the corresponding host. Under many operating circumstances a given VVol 40 may be accessible to only a single host, either forever or at least during extended operating periods. However, in some cases a VVol 40 may be accessible to multiple hosts, and in that case it is aggregated by multiple PEs 42 accordingly. FIG. 3 shows an example in which VVol 40-2 is aggregated by PE 42-2 (for one corresponding host) and also by PE 42-n (for another corresponding host). An example use case for such shared access is migration of a virtual machine from one physical machine to another.

More specifically, a PE 42 is a "conglomerate LUN" from the perspective of the SCSI protocol used for storage-related communications between the storage system 18 and the separate hosts. During operation, the VVols 40 become "bound" to a given PE 42. There may be multiple ways for such binding to occur. One is by an explicit "bind" command received by the data storage system 18 from an authorized entity, such as the management station 14 or a VC host for example. Binding may be static or dynamic as described below. The PE 42 serves as a single access point for data traffic for its bound VVols 40. In one embodiment, the data storage system 18 supports so-called "asymmetric logical unit access" (ALUA) by a multipathing function (driver) of the hosts, and the PEs 42 are visible as part of the logical paths extending to storage resources and used by the multipathing function.

Figure 4:
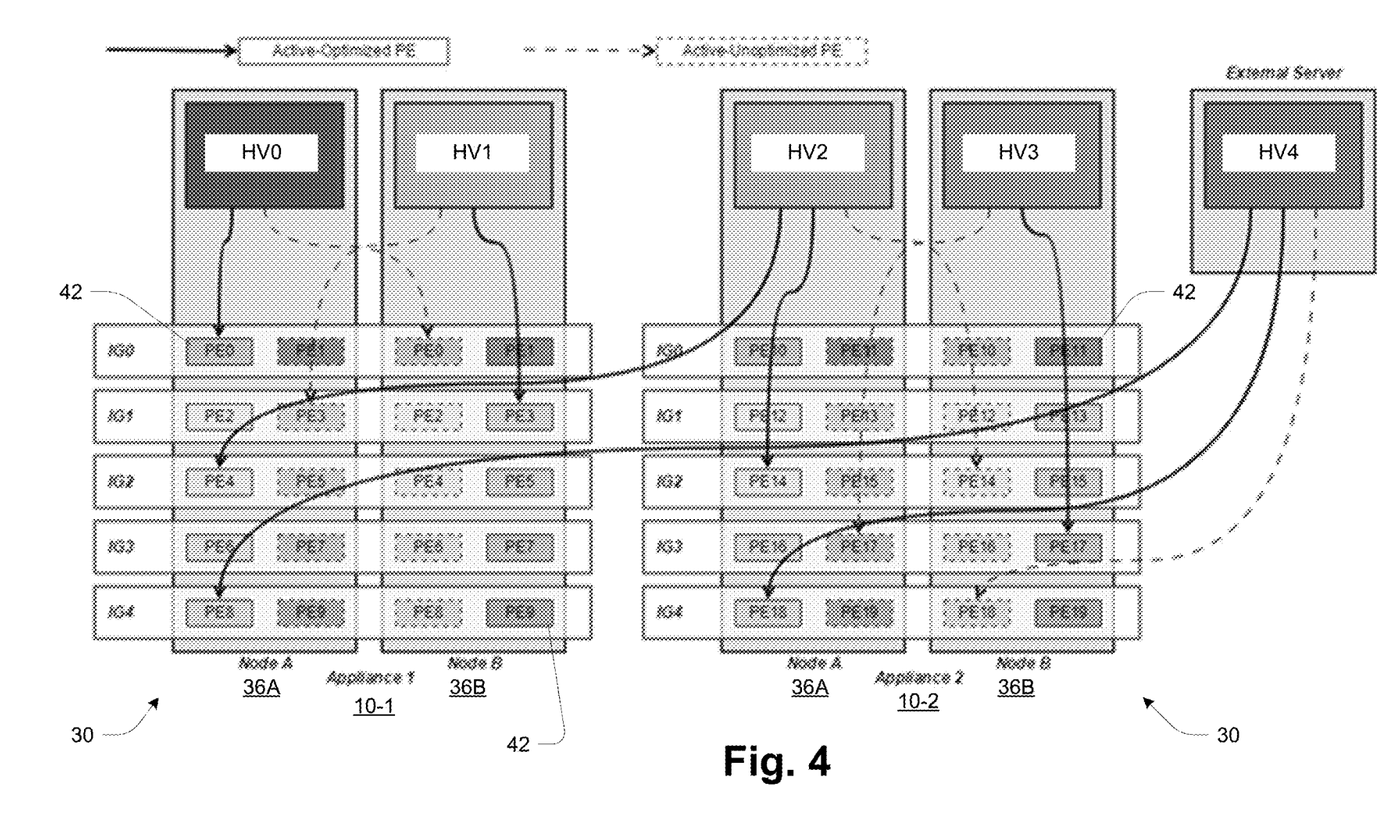
FIG. 4 is a schematic diagram depicting the use of initiator groups (IG) organizing PEs in a host-specific manner.

FIG. 4 is a schematic depiction of PE-related organization of the appliances 10, specifically of the data storage subsystem 30 of each appliance 10. In FIG. 4 the PEs 42 are assigned to "initiator groups" shown as IG0, IG1, etc. (generally IG). Access to PEs is granted at Initiator Group granularity, i.e. all initiators (i.e., hosts) from the specified IG can access the PEs of that IG. Also shown as forming part of each processing node 36 is a respective hypervisor, shown as HV0, HV1, etc. (generally HV). In this arrangement each appliance 10 contains two hypervisors HV, one executing on each node 36. The hypervisors HV may be realized in different ways. In one embodiment they may be realized as VMware ESXi™ hypervisors. In this description the hypervisors HV are also referred to as "hosts", indicating their function as sourcing data storage requests that are received and processed by the storage subsystems 30. Appliances 10-1 and 10-2 are examples of converged systems as discussed above. FIG. 4 also depicts the ability of a storage subsystem 30 to service requests from a separate standalone host, e.g., hypervisor HV4 on an external compute server as shown.

The initiator groups IG thus associate sets of the PEs 42 with corresponding hosts. For example, IG0 on appliance 10-1 associates PE0 and PE1 with host HV0, IG1 associates PE2 and PE3 with host HV1, etc. This means that a given host HVx accesses its respective VVols 40 (FIG. 3) via the PEs 42 of the respective initiator group IGx. Each appliance 10 contains as many IGs as the number of hosts HV for which the appliance stores VVols. Load balancing is accomplished by distributing the VVols between the two PEs 42 of each IG. Thus for IG0 on appliance 10-1, for example, the host HV0 accesses one set of its VVols 40 via PE0 on the A node 36A, and another set of its VVols 40 via PE1 on the B node 36B. In FIG. 4 the heavy black lines indicate primary or "active-optimized" paths, which are used during normal operation. Each node 36 also provides access via the other PE of the IG, which is advertised as an "active-unoptimized" path indicated by dashed lines. This applies to PE1 on node 36A and PE0 on node 36B, for example. This arrangement provides for failover or other secondary access by the corresponding host. Thus if the A node 36A of appliance 10-1 should fail for example, in the first instance the PEs PE0, PE2, etc. on the B node 36B would become the primary access points for the corresponding VVols by hosts HV0, HV2, etc.

The use of two PEs 42 per IG reflects the two-node arrangement of each storage subsystem 30. In alternative embodiments in which a storage system 30 has more than two independent processing units used in an active-active manner, an IG may have correspondingly more PEs (e.g., three for a 3-node processing arrangement, etc.).

The illustrated arrangement provides for high availability as there are two Asymmetric Logical Unit Access (ALUA) paths to the same PE one in active-optimized state and another in active-unoptimized. If the primary node 36 for a given PE (the one exposing active-optimized path) fails, all IO transactions continue over active-unoptimized path. Because the back end physical storage 32 is shared by both nodes 36 within an appliance 10, in either case all IO transactions are still served within the local appliance 10 without incurring any latency penalty by using re-direction to another appliance 10. This characteristic may be especially important for accesses to data hosted on devices 32 realized by non-volatile memory storage media.

With one PE being optimized on the A node 36A, SCSI commands including IO for the corresponding VVols are handled by that node, and similarly, with the other PE being optimized on the B node 36B, SCSI commands for the corresponding VVols are handled by that node. Since the two PEs 42 of a given IG collectively bind all VVols 40 hosted by the appliance 10 for that particular host HV, the choice of PE for each specific bind request from the hosts HV determines a VVol's affinity to a node. This enables a variety of possible approaches to load balancing. These can include:

1. Static load-balancing. The HV hosts are statically divided into two groups (for example based on identifiers being odd or even), and the VVols for each group are always bound through PEs on the respective node (e.g., first group to A node 36A, and second group to B node 36B). A static approach has the advantages of simplicity and ease of implementation.

2. Dynamic load balancing. For each incoming VVol bind request, one node 36A or 36B is selected based on more dynamic criteria, such as a goal of evenly distributing processing loading. Thus the current processing loads of the two nodes 36A, 36B may be evaluated, and the more lightly loaded node is selected for the new VVol binding. If during operation the node loading becomes unbalanced, there may be rebind events initiated to the HV hosts to cause VVols to be re-bound to nodes 36 having less load. This operation can have the effect of dynamically moving streams of IO traffic to different processing nodes, balancing the use of processing resources accordingly.

One aspect of storage system operation is to generate unsolicited Unit Attention messages and deliver them to one or more hosts (initiators) to provide useful operational information. With dedicated PEs 42 for each host HV, Unit Attentions raised by the storage system 30 are only received and reacted to by that specific host, which keeps the number of SCSI commands exchanged between hosts and the storage system 30 to a reasonable level and supports front-end scaling (i.e., support of more hosts).

Another scaling aspect of operation is the impact on scaling of out-of-band management traffic (e.g., VASA 2.0 API). The overall number of PEs in a system is equal to (2×Nhosts×Nappliances). In a cluster of 16 appliances 10 with 32 hosts HV results in 1,024 PEs. In some systems there is a much smaller limit of 256 on the number of PEs that can be reported in a response to an Enumerate command. By associating PEs 42 with the hosts HV via the IGs, the response to an Enumerate command from a given host can be limited to those PEs 42 associated with that host. In a VMware environment, to make sure the hosts HV recognize the PEs 42 correctly it is necessary to limit Protocol Endpoints returned to an ESXi host issuing a queryProtocolEndpointForArray( ) VASA command to only the PEs 42 visible to that specific ESXi host. In the hypothetical 16-appliance cluster, 32 PEs are returned instead of the complete list of 1,024, which would be outside of ESXi scaling limit.

Figure 5:
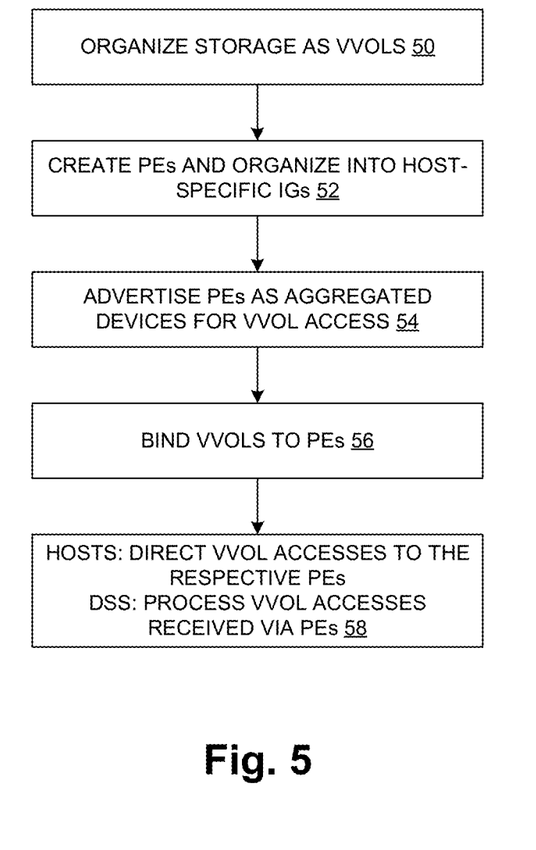
FIG. 5 is a flow diagram of operation of a data storage system.

FIG. 5 illustrates operation of a data storage system (e.g., 18) to provide virtual-volume data storage to a plurality of virtual-computing (VC) hosts (e.g., HV), wherein the data storage system includes first and second processing nodes (e.g., 36) paired in an active-active manner to provide for (a) shared processing of a workload in a non-failure operating condition, and (b) single-node processing of the workload in a failover operating condition.

At 50, the data storage system organizes physical storage as a plurality of virtual volumes (VVols, e.g., 40) each being a virtualized unit of storage for a corresponding virtual machine hosted by a respective VC host.

At 52, the data storage system creates per-host sets of protocol endpoints (PEs, e.g., 42) and organizes them into host-specific initiator groups (IGs). Each PE is a conglomerate storage device (e.g., conglomerate LUN) to which a respective set of the VVols are to be bound for access by a respective VC host. Each IG contains a pair of the PEs for a corresponding VC host, which are advertised and used subsequently.

At 54, the data storage system advertises the PEs of each IG to the corresponding VC hosts as aggregated devices for accessing the VVols. One PE of each pair in an IG is advertised to the VC host as optimized on the first processing node, and advertised to the VC host as non-optimized on the second processing node. The other PE of the pair is advertised to the VC host as optimized on the second processing node and advertised to the VC host as non-optimized on the first processing node. This advertising may be done in the form of a response to an Enumerate command. The advertising enables each VC host to configure itself for (a) primary access to corresponding VVols using the optimized PE of the corresponding IG, and (b) failover access to corresponding VVols using the unoptimized PE of the corresponding IG.

At 56, the data storage system binds the VVols to the PEs, each VVol of a given VC host being bound to one of the pair of PEs of the corresponding host-specific IG. This binding generally occurs based on receiving a bind request from a VC host or management entity as described above.

At 58, subsequent operation of the hosts is to direct VVol data access requests to the PEs to which the VVols are bound. The data storage system (DSS) processes these VVol data access requests as received via the PEs.

Figure 6:
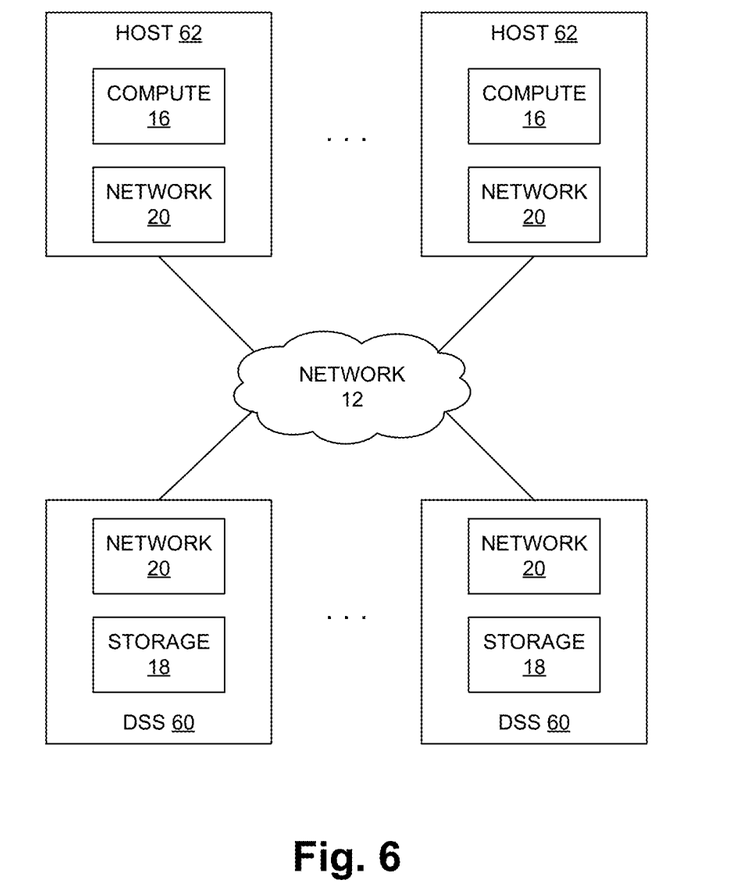
FIG. 6 is a block diagram of an alternative, non-converged data processing system employing standalone data storage systems.

FIG. 6 shows a system having an alternative configuration as briefly mentioned above, i.e., a more conventional non-converged system in which the storage subsystems 18 are contained within dedicated data storage systems (DSS) 60 coupled by network 12 to separate host systems 62, which execute system and application software in respective compute subsystems 16. The hosts 62 may be virtual-computing servers executing hypervisors HV as in the converged system of FIG. 4. However, there is not the relatively tight coupling between pairs of hypervisors HV and co-located PEs 42 as in the system of FIG. 4, as such co-location is absent. Nonetheless, the system benefits in a similar manner from use of the initiator group organization like that of FIG. 4.

In the system of FIG. 6, the DSSs 60 may still be organized as a cluster as in the system of FIG. 4. This means, among other things, that the DSSs 60 include functionality for maintaining operation in the event of failure of a complete DSS 60. The techniques described with reference to FIG. 4 are also applicable in this system arrangement.

In brief summary, the following are important characteristics of PEs 42 as described herein:
1. They aggregate VVols. This is preferably in a non-exclusive manner, so that VVols can be shared by multiple hosts by being associated with corresponding host-specific PEs.
2. They are host-specific, i.e., handle data and management traffic directed to the associated VVols from one corresponding host. Host specificity is provided by the use of host-specific initiator groups. This feature sets limits on Unit Attention messages and responses to Enumeration requests to promote scaling of system size.
3. They are node-specific and thus multiple-instanced (e.g., paired) on an appliance to (a) divide workload by dividing the aggregation of VVols, and (b) be advertised in both active-optimized and active-unoptimized states on different processing nodes to support ALUA access.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system in a cluster of storage systems to provide virtual-volume data storage to a plurality of virtual-computing (VC) hosts, the data storage system including first and second processing nodes paired in an active-active manner to provide for (a) shared processing of a workload in a non-failure operating condition, and (b) single-node processing of the workload in a failover operating condition, the method comprising:
organizing physical storage as a plurality of virtual volumes (VVols) each being a virtualized unit of storage for a corresponding virtual machine hosted by a respective VC host;
creating protocol endpoints (PEs) and organizing the PEs into host-specific initiator groups (IGs), each PE being a conglomerate storage device to which a respective set of VVols of the plurality of VVols are to be bound for access by a respective VC host, each IG containing a pair of the PEs for a corresponding VC host, one PE of the pair being advertised to the corresponding VC host as optimized on the first processing node and being advertised to the corresponding VC host as non-optimized on the second processing node, the other PE of the pair being advertised to the corresponding VC host as optimized on the second processing node and being advertised to the corresponding VC host as non-optimized on the first processing node;
binding the sets of VVols to the respective PEs, each VVol of a given set being bound to a corresponding one of the pair of PEs of the corresponding host-specific IG; and
subsequently providing data access to the plurality of VVols from each of the given VC hosts via the respective PEs,
wherein the providing of the data access via the respective PEs includes use of two asymmetric logical unit access (ALUA) paths from each VC host to the PEs of the respective IG, a first ALUA path being a primary access path to the optimized PE on the first processing node, a second ALUA path being a secondary access path to the non-optimized PE on the second processing node, the secondary access path being used when the first processing node for the optimized PE has failed.

2. The method of claim 1, wherein each of the PEs advertised as optimized serves as a respective primary access point for its respective bound set of VVols during normal operation, and wherein each of the PEs advertised as non-optimized serves as a failover or other secondary access point for its respective bound set of VVols in the event of node failure or other unavailability of the primary-access PE of the respective IG.

3. The method of claim 1, wherein the data storage systems are distributed as respective storage subsystems among a corresponding set of converged appliances each including (i) a respective compute subsystem for executing applications, (ii) a respective one of the storage subsystems, and (iii) a respective network subsystem configured and operative to provide cluster interconnection among the converged appliances.

4. The method of claim 3, wherein the first processing node of each converged appliance executes a respective hypervisor as well as a set of PEs of the IGs of the storage subsystem, each hypervisor forming a corresponding one of the VC hosts.

5. The method of claim 4, wherein the storage subsystem of each of the converged appliances provides access to those of the plurality of VVols for both (1) the hypervisors executed on the same respective converged appliance, by internal connections between the compute subsystem and storage subsystem thereof, and (2) the hypervisors executed on others of the converged appliances of the cluster, by the cluster interconnection.

6. The method of claim 5, wherein the storage subsystem of one or more of the converged appliances also provides access to those of the plurality of VVols for one or more external, non-converged hosts by a separate external connection.

7. The method of claim 1, wherein one or more of the plurality of VVols is accessible to multiple of the VC hosts, and is aggregated by respective PEs of the multiple VC hosts accordingly.

8. The method of claim 1, wherein the binding of the sets of VVols to the PEs is according to a static load-balancing scheme in which the respective VC hosts are statically divided into two groups and the sets of VVols for each of the groups are always bound through respective PEs on a respective processing node.

9. The method of claim 1, wherein the binding of the sets of VVols to the PEs is according to a dynamic load balancing scheme in which the binding of a each VVol of the sets of VVols is selected based on dynamic criteria.

10. The method of claim 9, wherein the dynamic criteria includes load balancing across processing nodes and selection of a more lightly loaded processing node for each binding.

11. The method of claim 10, further including monitoring node loading during operation and, upon the node loading becoming unbalanced, performing one or more rebind events to cause VVols of the sets of VVols to be re-bound to nodes having less load.

12. A data storage system for use in a cluster of storage systems to provide virtual-volume data storage to a plurality of virtual-computing (VC) hosts, the data storage system including first and second processing nodes paired in an active-active manner to provide for (a) shared processing of a workload in a non-failure operating condition, and (b) single-node processing of the workload in a failover operating condition, the data storage system including storage devices providing physical storage, interface circuitry for connecting the data storage system to the VC hosts, and storage processing circuitry including first and second processing nodes, the first and second processing nodes being configured and operative to execute corresponding computer program instructions to cause the data storage system to perform a method including:
   organizing physical storage as a plurality of virtual volumes (VVols) each being a virtualized unit of storage for a corresponding virtual machine hosted by a respective VC host;
   creating protocol endpoints (PEs) and organizing the PEs into host-specific initiator groups (IGs), each PE being a conglomerate storage device to which a respective set of VVols of the plurality of VVols are to be bound for access by a respective VC host, each IG containing a pair of the PEs for a corresponding VC host, one PE of the pair being advertised to the corresponding VC host as optimized on the first processing node and being advertised to the corresponding VC host as non-optimized on the second processing node, the other PE of the pair being advertised to the corresponding VC host as optimized on the second processing node and being advertised to the corresponding VC host as non-optimized on the first processing node;
   binding the sets of VVols to the respective PEs, each VVol of a given set being bound to a corresponding one of the pair of PEs of the corresponding host-specific IG; and
   subsequently providing data access to the plurality of VVols from each of the given VC hosts via the respective PEs,
   wherein the providing of the data access via the respective PEs includes use of two asymmetric logical unit access (ALUA) paths from the VC host to the PEs of the respective IG, a first ALUA path being a primary access path to the optimized PE on the first processing node, a second ALUA path being a secondary access path to the non-optimized PE on the second processing node, the secondary access path being used when the first processing node for the optimized PE has failed.

13. The data storage system of claim 12, wherein each of the PEs advertised as optimized serves as a respective primary access point for its respective bound set of VVols during normal operation, and wherein each of the PEs advertised as non-optimized serves as a failover or other secondary access point for its respective bound set of VVols in the event of node failure or other unavailability of the primary-access PE of the respective IG.

14. The data storage system of claim 12, wherein the data storage system is one of a set of data storage systems distributed as respective storage subsystems among a corresponding set of converged appliances each including (i) a respective compute subsystem for executing applications, (ii) a respective one of the storage subsystems, and a respective network subsystem configured and operative to provide cluster interconnection among the converged appliances.

15. The data storage system of claim 14, wherein the first processing node of each converged appliance executes a respective hypervisor as well as a set of PEs of the IGs of the storage subsystem, each hypervisor forming a corresponding one of the VC hosts.

16. The data storage system of claim 15, wherein the storage subsystem of each of the converged appliances provides access to those of the plurality of VVols for both (1) the hypervisors executed on the same respective converged appliance, by internal connections between the compute subsystem and storage subsystem thereof, and (2) the hypervisors executed on others of the converged appliances of the cluster, by the cluster interconnection.

17. The data storage system of claim 16, wherein the storage subsystem of one or more of the converged appliances also provides access to those of the plurality of VVols for one or more external, non-converged hosts by a separate external connection.

18. The data storage system of claim 12, wherein one or more of the plurality of VVols is accessible to multiple of the VC hosts, and is aggregated by respective PEs of the multiple VC hosts accordingly.

19. The data storage system of claim 12, wherein the binding of the sets of VVols to the PEs is according to a static load-balancing scheme in which the respective VC hosts are statically divided into two groups and the sets of VVols for each of the groups are always bound through respective PEs on a respective processing node.

20. The data storage system of claim 12, wherein the binding of the sets of VVols to the PEs is according to a dynamic load balancing scheme in which the binding of each VVol of the sets of VVols is selected based on dynamic criteria.

21. The data storage system of claim 20, wherein the dynamic criteria includes load balancing across processing nodes and selection of a more lightly loaded processing node for each binding.

* * * * *